UNITED STATES PATENT OFFICE.

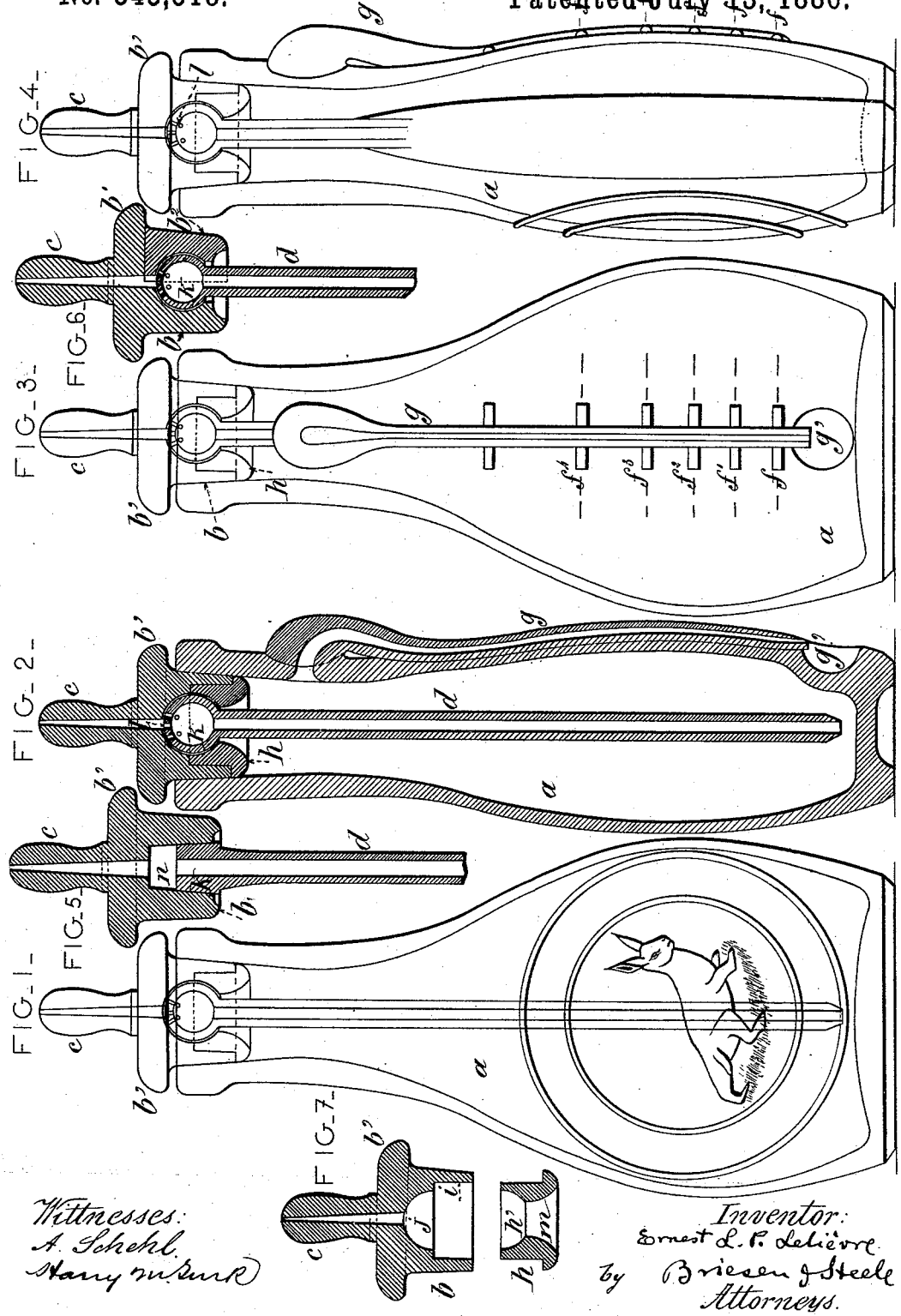

ERNEST LOUIS PHILIPPE LELIÈVRE, OF CAEN, FRANCE.

NURSING-BOTTLE.

SPECIFICATION forming part of Letters Patent No. 345,518, dated July 13, 1886.

Application filed March 27, 1886. Serial No. 196,772. (No model.) Patented in France October 12, 1885, No. 172,130.

*To all whom it may concern:*

Be it known that I, ERNEST LOUIS PHILIPPE LELIÈVRE, a citizen of France, residing at Caen, in the French Republic, have invented new and useful Improvements in Infants' Feeding-Bottles, of which the following is a specification, and for which I have obtained Letters Patent in France, No. 172,130, dated October 12, 1885.

The bottle forming the subject of the present invention is constructed entirely of glass. It is therefore easily kept clean and wholesome. Its construction is such as to render it eminently adapted to fulfill the requirements so imperatively necessary for the health of infants.

Figure 1 of the accompanying drawings represents a bottle of the description embodying my invention, shown in vertical and front elevation, on which is fixed the trade-mark. Fig. 2 is a transverse section and side view of the same. Fig. 3 shows the bottle as seen from the side opposite that represented by Fig. 1, showing marks or a scale representing the quantity of milk required to be diluted with water as the infant progresses in age. Fig. 4 is a side view of Figs. 1 and 3. Fig. 7 shows two parts of stopper separated.

The feeding-bottle consists of three perfectly distinct parts of glass: first, the glass bottle $a$; secondly, the stopper $b$, with mouth-piece $c$, of one single piece of glass; thirdly, a glass tube, $d$.

The bottle $a$ bears on one of its sides suitable wording surrounding the trade-mark, (a hare.) On each side are other words, as seen, Fig. 4. On the other face the bottle bears a graduated scale, which measures or indicates the quantity of water that is required with the cow's milk, so as to fill the bottle in accordance with advancing age of the infant. The first week the bottle only contains a fifth part of milk. The level of the milk is then at $f$ before the introduction of water. The second week there is a fourth part of milk, and the level of the milk will reach the line $f'$. The second fortnight the proportion of milk is a third of the capacity of the bottle, and the level will reach the line $f^2$. The second and third months half milk and half water is used, the level of the milk before the addition of water being at the level $f^3$. The fourth, fifth, and sixth months the bottle is filled with milk up to the line $f^4$. After six months pure milk can be given. On the same side as the scale is a tube, $g$, which is a special feature of this bottle. It is fixed to the neck, and reaches to the bottom of the bottle, so that the air taken in at $g'$ is conducted to the neck without passing through the liquid. This arrangement allows the infant to swallow the liquid without the effort of suction or interfering with respiration, which in all other feeding-bottles greatly exhausts the stomach, and prevents the liquid running down the sides of the bottle while the infant is using it.

The stopper $b$, closing the bottle, is hollowed inside. It is ground with emery inside and outside, and hermetically closes the bottle. The upper portion forms a cap, $b'$, in the center of which is the glass mouth-piece $c$. The internal hollow of the stopper $b$ comprises, first, a cylindrical or cylindro-conical portion, $i$, then a semi-spherical part, $j$, in which is the suction-aperture of the mouth-piece $c$. An additional stopper, $h$, fits into the part $i$ of the stopper $b$. At its upper part is a semi-spherical aperture, $h'$, which communicates with that $j$, the two together forming a complete spherical opening. In this spherical aperture $h'j$ the spherical head $k$ of a glass tube, $d$, fits loosely. The head $k$ is pierced at the upper part with a number of small holes, $l$. The tube $d$ can oscillate in all directions, due to the play of the head $k$ in its spherical cavity, as well as to a cavity, $m$, made in the base of the stopper $h$.

The tube $d$ is only necessary when the bottle is held upright, for when held in the nurse's hand she can give drink to the infant without inconvenience and with the greatest ease.

Fig. 5 shows a stopper, $b$, separate from the bottle. It is hollowed with a truncated aperture, $n$, in which the head $k$ (of the same shape as the cavity) fits, and terminates the tube $d$. This arrangement, although not equal to that shown by Figs. 1, 2, 3, and 4, also Fig. 6, hereinafter explained, may be employed, but requires a certain amount of attention by the nurse.

In Fig. 6 the spherical head $k$ of the tube $d$ is secured to the stopper $b$ in the following manner. The stopper below the cap $b'$ is in two parts, $b\ b^2$, which are joined vertically, so admitting of the introduction of the sphere $k$, and also placing the stopper in position in the bottle-neck. As in Figs. 1, 2, 3, and 4, the spherical head $k$ plays freely in the cavity of the stopper $b\ b^2$, so that the tube can oscillate in all directions in the parts, $b\ b^2$ being hollowed for this purpose, as well as for the passage of tube $d$.

By the arrangement shown, Fig. 6, and particularly those shown by Figs. 1, 2, 3, and 4, to which preference is given, the infant can drink from the bottle in any position it may be placed, as one of the holes $l$ of the sphere $k$ is always directly opposite the hole of the mouth-piece $c$.

Although glass is mentioned as to be used in preference to other substances, still other matters or metals may be employed in the construction of its several parts, as long as such matters or substances are not corrodible.

What I claim as my invention, and desire to secure by Letters Patent, is—

1. The infant's feeding-bottle made in one piece with the tube $g$, which communicates with the external atmosphere, for conducting the external air to the neck of the bottle without passing through the liquid with which it is filled.

2. The glass stopper for feeding-bottles, having glass mouth-piece $c$, molded or otherwise formed in one piece with the stopper, said stopper being on its under side hollowed for the reception of and combined with the perforated spherical head of the suction-tube, and with a retaining-piece, all arranged to allow of the free oscillation of this tube in any direction, as specified.

3. The glass stopper and mouth-piece made of a single piece of glass, with hemispherical aperture for the reception of the spherical head $k$ of the suction-tube $d$, in combination with the supplementary stopper $h$, fitting into the socket $i$, and with the said spherical head $k$, which has holes $l$ for the passage of the fluid, as specified.

ERNEST LOUIS PHILIPPE LELIÈVRE.

Witnesses:
ROBT. M. HOOPER,
ALPHONSE BLÉTRY.